Dec. 29, 1931.         H. M. SALISBURY ET AL         1,838,327
                          GYROSCOPIC AIRPLANE
                Filed Dec. 11, 1929      4 Sheets-Sheet 4

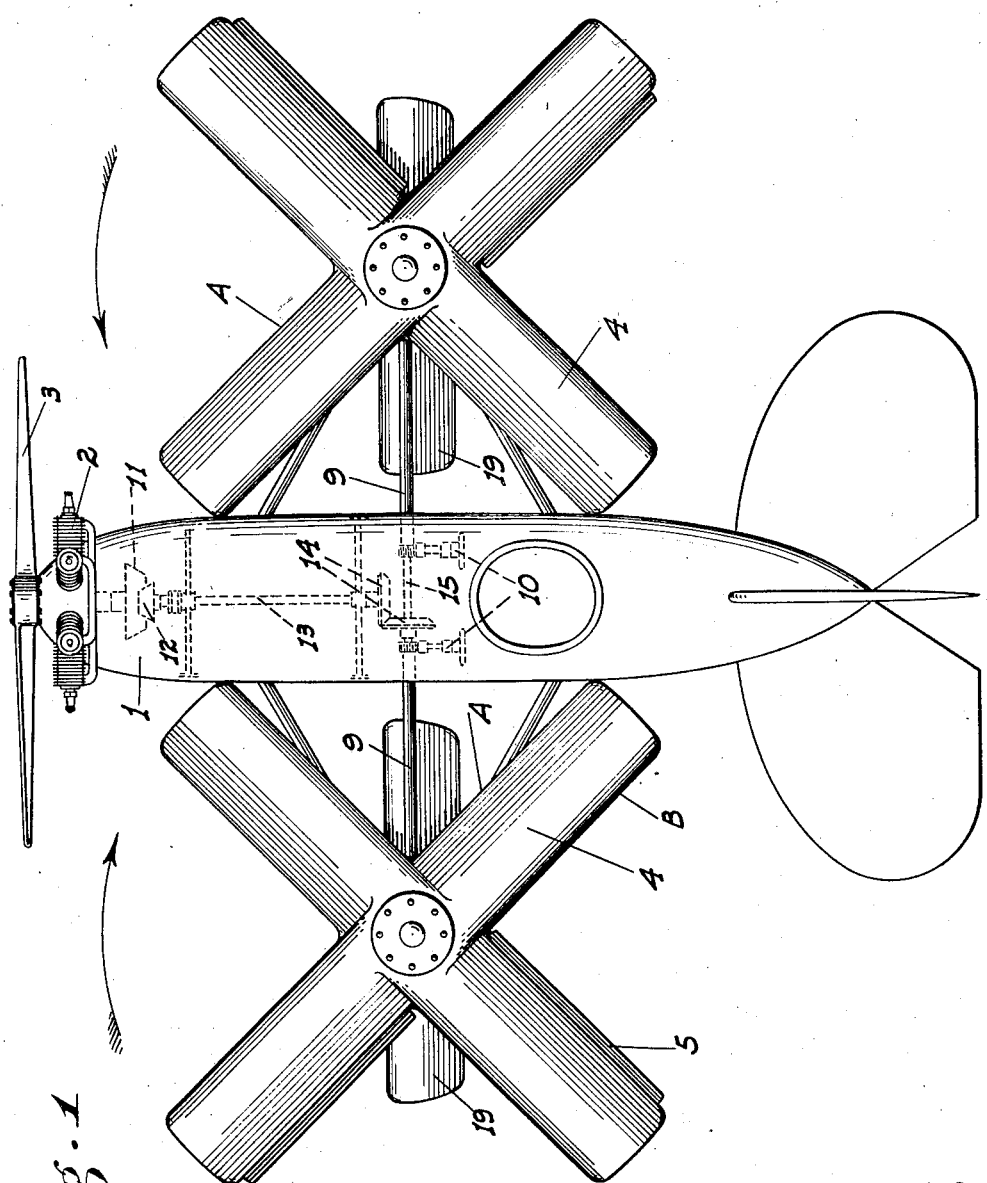

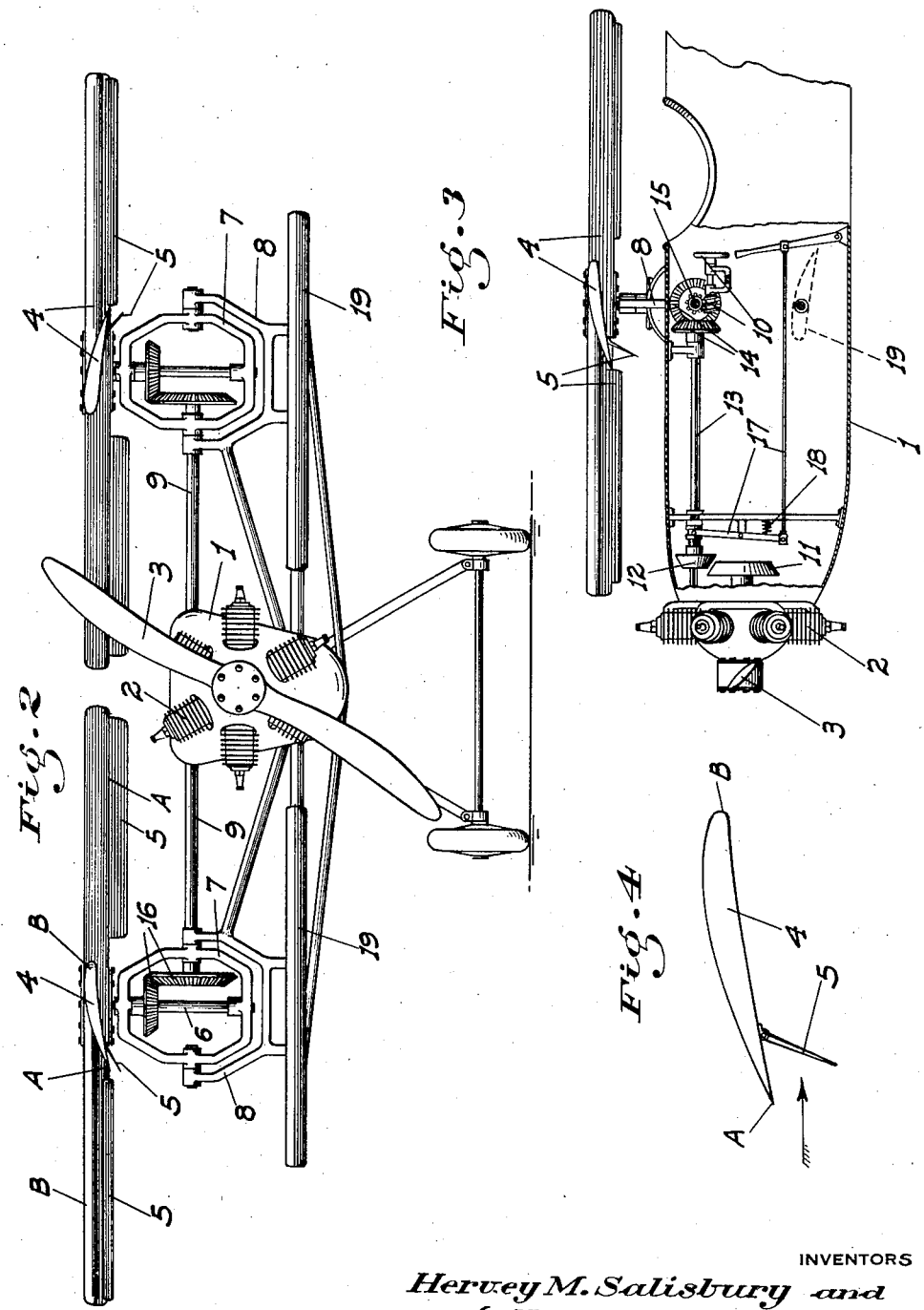

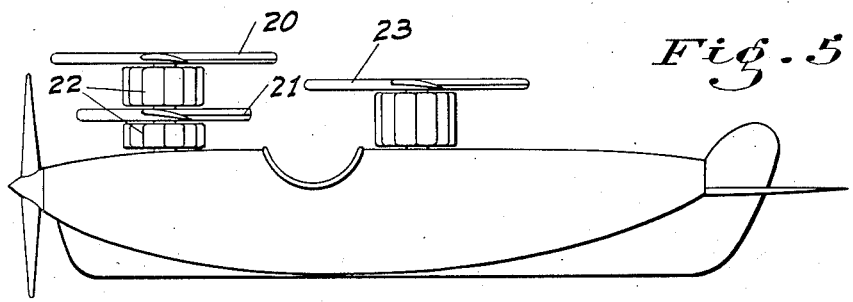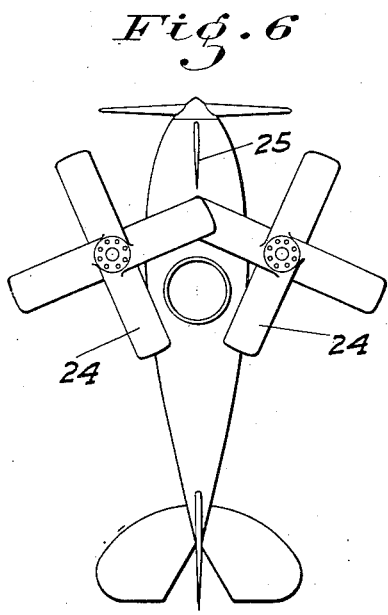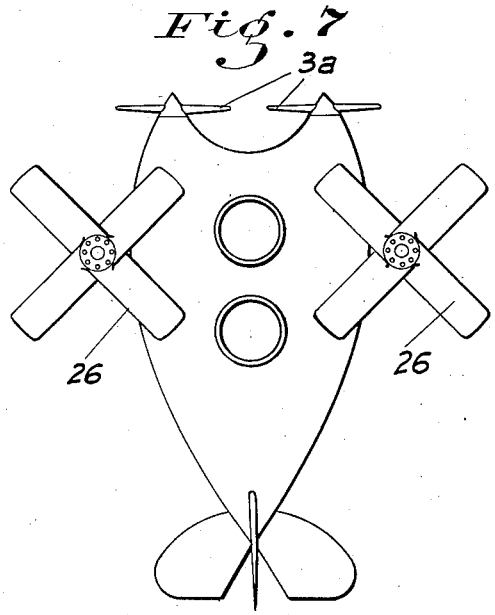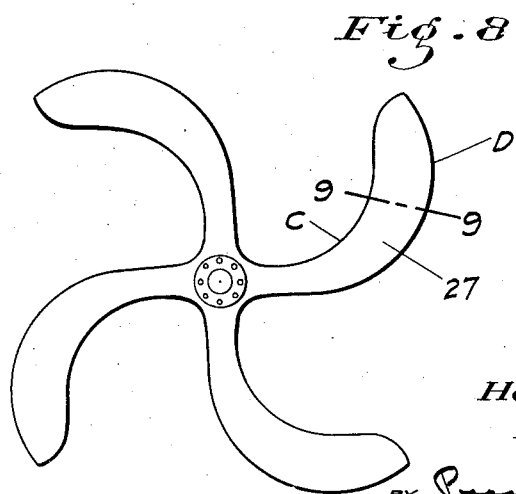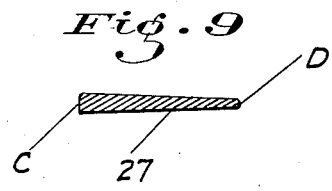

INVENTORS
*Hervey M. Salisbury* and
*Arthur E. Miller*
BY
ATTORNEY

Patented Dec. 29, 1931

1,838,327

UNITED STATES PATENT OFFICE

HERVEY M. SALISBURY, OF WALNUT GROVE, AND ARTHUR E. MILLER, OF SACRAMENTO, CALIFORNIA

GYROSCOPIC AIRPLANE

Application filed December 11, 1929. Serial No. 413,220.

This invention relates to airplanes of the type which are raised and lowered in a vertical practically perpendicular direction, and in which the usual fixed wings are replaced by lifting and supporting propellers, which heretofore had been arranged so as to be continously power driven all the time the airplane is off the ground.

The principal object of our invention is to provide an airplane of this general character, and which of course has the obvious advantages of the type in taking off and landing, in which the supporting propellers are arranged so that while they may be positively driven from the engine of the main driving propeller of the airplane when taking off or landing; they are normally disengaged from such driving relationship and are then driven solely by the rearwardly flowing air stream set up by the rapid rotation of the driving propeller. The entire power of the engine is thus normally utilized in propelling the airplane forwardly, while at the same time the supporting propellers may be power driven whenever necessary or desirable without the need of a separate engine being provided, and which would correspondingly increase the load to be lifted.

The supporting propellers are also arranged so that they may be independently tilted longitudinally of the airplane in one direction or the other at the option of the pilot, as may be desired to alter their lifting effect.

A further object of the invention is to provide a simple and inexpensive device, and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a top plan view of our improved airplane.

Fig. 2 is a front elevation of the same.

Fig. 3 is a fragmentary longitudinal section of the airplane showing the disengageable drive connections between the main propeller engine and the supporting propellers.

Fig. 4 is an end view of a supporting propeller blade.

Figs. 5 to 7 are more or less diagrammatic views showing modified arrangements of the supporting propellers.

Fig. 8 is a plan view of a modified form of supporting propeller.

Fig. 9 is a cross section on the line 9—9 of Fig. 8.

Figure 10:
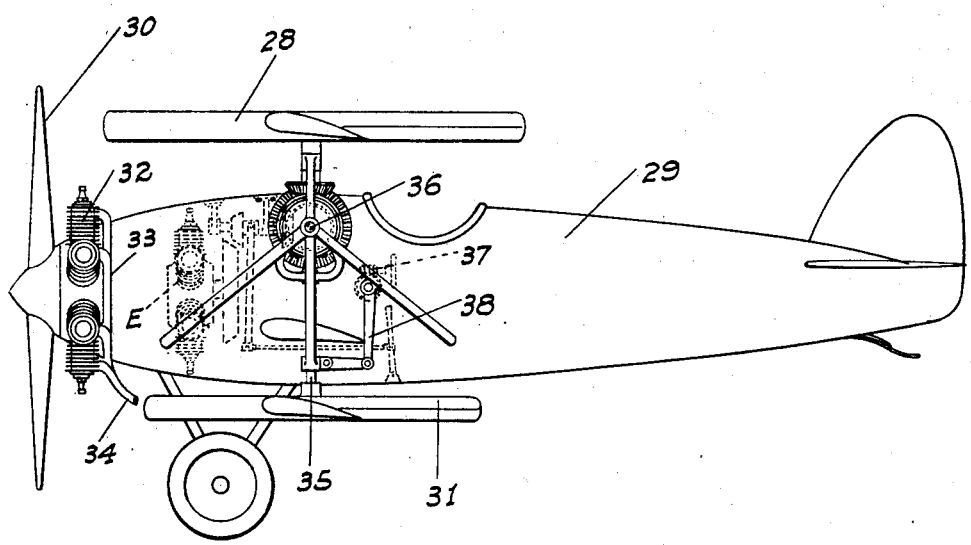
Fig. 10 is a side elevation of still another modified arrangement of the supporting propellers.
Figure 11:
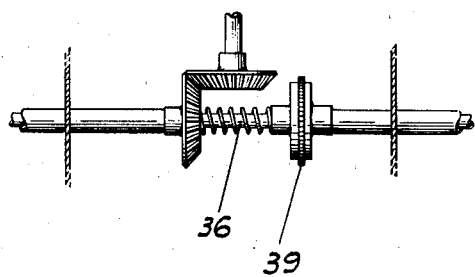
Fig. 11 is a fragmentary view showing a modified form of lifting-propeller connecting and driving-countershaft.

Referring now more particularly to the characters of reference on the drawings, the numeral 1 denotes the fuselage of the airplane, which may be of any ordinary or conventional form, and which is provided at its nose with an engine 2 connected to the driving propeller 3 of common type. Disposed above the fuselage rearwardly of said propeller and arranged in transversely spaced relation to each other and symmetrically relative to the longitudinal central plane of the airplane are the lifting and supporting propellers 4. These are of substantially rectangular surface area but are of aerofoil form in cross section, as shown in Fig. 4. These propellers are positioned so that they lie in the horizontal plane of the air stream thrown rearwardly from the main propeller with the operation of the same; the adjacent blades of the separate propellers when transversely disposed both lying in the path of the air stream so as to be engaged thereby with practically equal force. Said blades therefore turn rearwardly, and the propellers as a whole of course rotate in opposite directions. The blades are formed so that their relatively thin edges A face the air stream, and depending from under the blades along said edges are rigid hinged flaps 5. These flaps turn down of themselves when passing into the air stream, so as to be acted on by the air, and fold upwardly against the under surface of the blades when the latter turn out of the stream so that they then offer no resistance to the air moving past the outermost and forwardly rotating blades. The pitch of the blades of course is such that when the blades are turning so that their relatively thick edges B are leading or cutting into the air they will exert a lifting power on the airplane, the effectiveness of which is of course governed by the speed of rotation.

The lifting and supporting propellers are preferably mounted in the same manner as those shown in our copending application for patent, Serial No. 392,558, filed September 14, 1929, or as follows:

The vertical shaft 6 of each supporting propeller is turnable in a yoke frame 7 which in itself is turnably supported on a horizontal axis transversely of the airplane, in a supporting frame 8 rigid with said airplane. Fixed to the yokes of both propellers and extending axially therefrom into the fuselage are independent torque tubes 9, the ends of which inside the fuselage are connected to separate manual control means, as indicated at 10 in Fig. 3.

The propeller shafts are adapted to be connected in driving relation with the engine 2 at the option of the pilot by the following means:

Fixed on the rear end of the engine shaft is a friction wheel 11 arranged to be engaged by a friction pinion 12. This pinion is slidable on a longtudinally extending shaft 13 which at its rear end is connected by gearing 14 to a transverse shaft 15 which projects through both tubes 9. At its outer ends said shaft is connected in driving relation to the shafts 6 by bevel gearing 16 or the like. It will therefore be seen that by means of this arrangement, whether the pinion 12 is engaged with the wheel 11 or not, both supporting propellers are connected together in such a manner that they must turn simultaneously and at the same speed. This avoids the possibility of one propeller exerting a greater lifting force than the other and causing the airplane to possibly go into a side slip.

As will be seen from the drawings the friction wheel or gear 11 is considerably larger than the pinion 12, while the engine as usual is directly connected to the driving propeller. By this arrangement therefore, with a certain speed of the engine and driving propeller, the lifting propeller if being driven will turn at a much greater speed than said driving propeller. This enables the airplane to be propelled horizontally at a low speed, while taking off or landing, while at the same time the lifting propellers will be turning at a sufficiently high speed to properly support the craft in the air and cause the same to move directly up or down. Also the airplane may be maneuvered more effectively and accurately than if the driving propeller were not working at all. The use of a single power plant for all the propellers, instead of a separate one for each propeller, avoids the considerable increase in dead weight which the latter arrangement would necessitate.

The pinion 12 is associated with a manually operable shifting means 17 and is normally held disengaged from the wheel 11 by a suitably arranged spring 18.

Ordinarily therefore the lifting propellers turn freely and at the same speed, which is governed by the force of the air stream from the engine, but when desired the pinion 12 may be engaged with the wheel 11 and the propellers thus positively driven by the engine independent of the action of the air stream, though of course such stream at all times aids in rotating the propellers.

The lifting power of these propellers may be altered at will by turning the tubes 9 one way or the other through a short arc which places the propellers at corresponding angles to a horizontal plane without affecting their being driven by the air stream. Ailerons 19 of common form and preferably disposed under the frames 8 are however provided for ordinary control purposes.

In Fig. 5 we have shown a modified arrangement of lifting propellers. Such arrangement consists of longitudinally spaced propeller units, each of which comprises a transversely spaced pair as in the first described type. Each forward unit comprises an upper propeller 20 and a lower propeller 21 mounted in fixed coaxial relation with each other and spaced apart. Disposed between these propellers and also under the lower propeller we may mount relatively small turbine wheels 22, fixed axially with said propellers. The rear propeller units each comprises a propeller 23 disposed in a horizontal plane between the forward propellers 20 and 21.

A turbine wheel may also be mounted in connection with each such rear wheel propeller if desired.

In Fig. 6, the arrangement of the supporting propellers 24 is the same as in the first type, but they are set closer together and on slightly different levels so as to overlap somewhat, as shown. This is so as to place the propellers where both will receive an air stream of equal velocity in the event that there is a difference in such velocity at different levels on the opposite sides of the longitudinal center line of the plane, due to the direction of rotation of the driving propeller. A longitudinally extending partition or deflecting vane 25 may be fixed on the top of the fuselage just rearwardly of the driving propeller, so that the air stream will be positively divided and directed against the adjacent blades of the lifting propellers.

In Fig. 7 we have provided a pair of transversely spaced driving propellers 3a, each of which acts through its air stream on the corresponding lifting propeller 26.

In all these types the driving arrangement and mounting of the different propellers is preferably the same as that described in connection with the first or main type.

In Figs. 8 and 9 we have shown a modified shape of lifting propeller which may be employed in place of the substantially rectangular propellers shown in the various types. In this modified form of propeller the longitudinal edges of the blades 27, are both concavely curved, on different radii and centers relative to the air stream from the driving propeller. Also the relatively thick edge C of each blade is the one which faces the air stream instead of the reverse, as in the other type, while the thin edge D is the leading edge with respect to the air into which the propeller turns.

If desired all the propellers shown and described may be suitably weighted so that when they once attain a certain speed they will tend to keep turning with a lesser expenditure of power than is otherwise the case, and their movement will be steadier.

In Fig. 10 in addition to the lifting propellers 28 mounted above the fuselage 29 and disposed in the air stream from the upper portion of the driving propeller 30 as in the first described structures; additional lifting propellers 31 are provided which are mounted to the sides of the fuselage below or so as to be in the line of the air stream from the lower portion of the propeller 30. With this arrangement we also utilize the exhaust gases from the engine 32 of the propeller 30; the exhaust manifold 33 having rearwardly and laterally extending branches 34, one on each side of the fuselage, and positioned so that the streams of exhaust gases issuing therefrom also engage and help to actuate the corresponding propellers 31.

The lower propellers 31 are mounted on upstanding shafts 35 operatively connected to the transverse counter-shaft 36 of the upper propellers; said counter-shaft as in the first described type being adapted to be driven from a power plant at the option of the pilot.

In this case however such power plant is indicated as being an engine E independent of the engine 32—an arrangement which may be employed in the other types as well.

The propellers 31 are preferably mounted so that they can be swung about the shaft 36 as an axis so as to alter the angularity of said propellers relative to a horizontal plane. This may be done by suitable means such as by hand controlled worm wheel devices 37 connected by linkage 38 to the propeller-shaft supporting yoke or similar part.

In any of these arrangements, it is possible that the force of the air stream from the driving propeller might be so distributed as to tend to rotate one supporting propeller faster than the other. This in turn might cause stripping of the gears of one or the other of the propeller drives, and can be avoided by making the counter-shaft 36 in two alined sections, separated in the fuselage between the torque tubes, and connecting said sections by a friction drive coupling 39. This would slip if the propeller developed an excessive tendency to rotate unevenly.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention what we claim as new and useful and desire to secure by Letters Patent is:

1. In an airplane, a main driving propeller, a supporting propeller mounted on a vertical axis and positioned to be rotated by the horizontal air stream set up by the rotation of the driving propeller, and hinged flaps depending from those longitudinal edges of the blades of the supporting propeller which face the air stream, said flaps being arranged to lie in a substantially vertical plane when the respective blades are moving into the air stream and to fold against the blades when the latter leave the air stream.

2. In an airplane, a main driving propeller, a pair of transversely spaced supporting propellers disposed on vertical axes and positioned so that their blades lie in the path of the horizontal air stream set up by the rotation of the driving propeller so as to be rotated by said air stream, and means connecting said propellers to cause them to normally rotate simultaneously and at the same speed, said means including a friction slip coupling.

3. In an airplane, a main driving propeller, a pair of transversely spaced supporting propellers disposed on vertical axes and positioned so that their blades lie in the path of the horizontal air stream set up by the rotation of the driving propeller so as to be rotated by said air stream, the said lifting propellers being spaced apart vertically and their transverse spacing being less than their diameter, whereby adjacent blades of the propellers will overlap.

4. In an airplane, a main driving propeller, a pair of transversely spaced supporting propellers disposed on vertical axes and positioned so that their blades lie in the path of the horizontal air stream set up by the rotation of the driving propeller so as to be rotated by said air stream, and a longitudinally extending partition mounted on the airplane in the horizontal plane of the supporting propellers and positioned between the driving propeller and the supporting propellers in centrally disposed relation to the latter.

In testimony whereof we affix our signatures.

HERVEY M. SALISBURY.
ARTHUR E. MILLER.